(12) United States Patent
Ping et al.

(10) Patent No.: US 8,842,590 B2
(45) Date of Patent: Sep. 23, 2014

(54) MOBILE DEVICE AND DATA CONNECTION METHOD THEREOF

(75) Inventors: Shan-Wei Ping, Taoyuan County (TW);
Chih-Yang Kuo, Taoyuan County (TW);
Sz-Shian Li, Taoyuan County (TW);
Szu-Han Wu, Taoyuan County (TW);
Yu-Ti Su, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 716 days.

(21) Appl. No.: 12/506,374

(22) Filed: Jul. 21, 2009

(65) Prior Publication Data

US 2011/0019600 A1 Jan. 27, 2011

(51) Int. Cl.
*G08C 17/00* (2006.01)
*G06F 1/00* (2006.01)
*G06F 1/32* (2006.01)
*G06F 9/50* (2006.01)

(52) U.S. Cl.
CPC .............. *G06F 1/3203* (2013.01); *Y02B 60/142* (2013.01); *G06F 1/3209* (2013.01); *Y02B 60/121* (2013.01); *G06F 1/3293* (2013.01); *G06F 9/5094* (2013.01)
USPC ........................................... 370/311; 713/323

(58) Field of Classification Search
USPC .......................................................... 370/311
See application file for complete search history.

(56) References Cited

U.S. PATENT DOCUMENTS

| 7,865,752 | B2 * | 1/2011 | Brabenac ...................... 713/323 |
| 2007/0061417 | A1 * | 3/2007 | Berg ............................. 709/217 |
| 2009/0077412 | A1 * | 3/2009 | Langford et al. ................. 714/4 |
| 2010/0165897 | A1 * | 7/2010 | Sood ............................. 370/311 |

FOREIGN PATENT DOCUMENTS

| CN | 101022222 A | 8/2007 |
| CN | 101453365 A | 6/2009 |
| TW | 200419370 A | 10/2004 |
| TW | 200625871 A | 7/2005 |

* cited by examiner

*Primary Examiner* — Brandon Renner
(74) *Attorney, Agent, or Firm* — Birch, Stewart, Kolasch & Birch, LLP

(57) ABSTRACT

A mobile device with a port map maintaining a list of open ports for incoming data packets is provided. A first processor receives and demodulates inbound signals into data packets. A second processor processes at least one application bound to at least one open port. The second processor enters a sleep mode to reduce power consumption if no data packet is sent from the first processor to the second processor. When the first processor receives an inbound request signal, the first processor demodulates the inbound request signal into a first data packet targeted to a destination port, and looks up the port map to determine whether the destination port is listed in the port map. If the destination port is not listed in the port map, the first processor transmits a response signal to the sender of the inbound request signal or omits the inbound request signal without waking up the second processor.

16 Claims, 4 Drawing Sheets

| Port | Protocal type | |
|------|---------------|---|
| 13 | TCP | —135 |
| 21 | TCP | |
| 22 | UDP | |
| 23 | TCP | |
| 25 | TCP | |
| 53 | UDP | |
| 80 | TCP | |
| 113 | TCP | |

MOBILE DEVICE AND DATA CONNECTION METHOD THEREOF

BACKGROUND OF THE INVENTION

1. Field of the Invention

The invention relates to mobile devices with multiprocessor, and in particular, to a method for reducing power consumption during data connection.

2. Description of the Related Art

For public internet services via wireless access, traffic directed to a user equipment (UE) is not always meant for the UE. Such traffic can be from unknown sources trying to probe the UE TCP open ports to gain unauthorized accesses to the UE. According to the Transmission Control Protocol/Internet Protocol (TCP/IP) standard, when a sender side tries to open sockets to a targeted UE, the sender side will send a TCP [SYN] packet to determine whether the target UE's TCP port is open. If the UE's TCP port is not in a listening state or in other words there is no service running on that particular port, the UE will send an RST ACK response back to the sender. For conventional operations such as Telnet, the sender will retry twice before finally giving up and determining a failed connection. Meanwhile, unwanted traffic, also known as garbage traffic, causes problems, particularly in $3^{rd}$ Generation Partnership Project (3GPP), 3.5G or 2G data connections. When the UE activates a Packet Data Protocol (PDP) context in the 3G or 2G Network to obtain a public IP address for data connection, the UE is exposed to the internet unprotected, and consequently may be overwhelmed by garbage traffic.

Processing the garbage traffic takes a significant amount of power consumption. The negative effect is most noticeable for mobile devices with limited battery life. Therefore, a method for reducing power consumption during data connection is desired.

BRIEF SUMMARY OF THE INVENTION

An embodiment of the invention is a mobile device. In the mobile device, a port map maintains a list of open ports for incoming data packets. A first processor is coupled to the port map, receiving and demodulating inbound signals into data packets. A second processor is coupled to the first processor, processing at least one application bound to at least one open port. The second processor enters a sleep mode to reduce power consumption if no data packet is sent from the first processor to the second processor. When the first processor receives an inbound request signal, the first processor demodulates the inbound request signal into a first data packet targeted to a destination port, and looks up the port map to determine whether the destination port is listed in the port map. If the destination port is not listed in the port map, the first processor transmits a response signal to the sender of the inbound request signal without waking up the second processor.

Another embodiment of the invention is a data connection method adapted in the aforementioned mobile device. A port map comprising a list of open ports for incoming data packets, is maintained. Therefore the first processor filters out garbage packets without waking up the second processor.

A further embodiment of the invention is a mobile device with multiprocessor, comprising means for filtering, transceiving, and processing signals.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
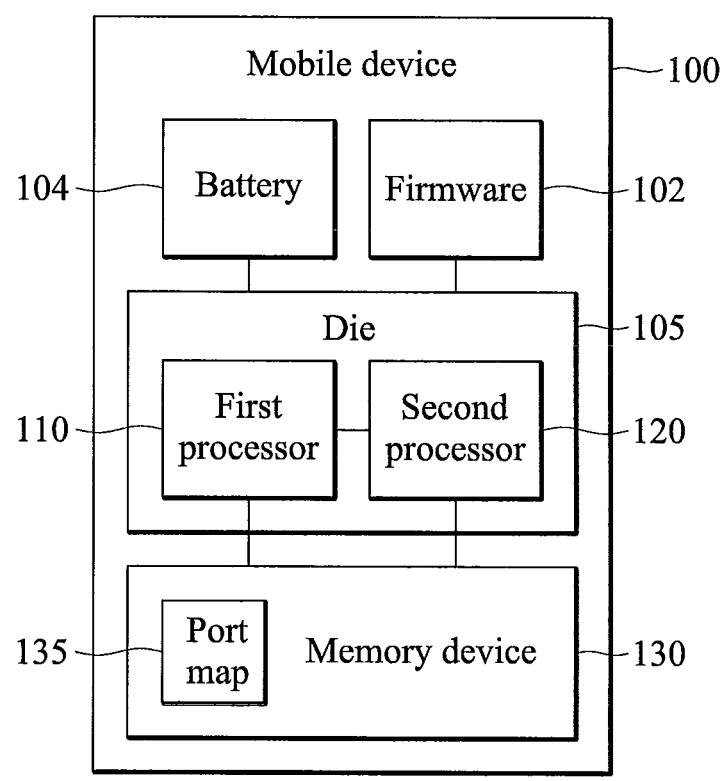
FIG. 1 shows an embodiment of a mobile device with multiprocessor according to the invention.

FIG. 1 shows an embodiment of a mobile device 100 with multiprocessor according to the invention. The mobile device 100 comprises a first processor 110 and a second processor 120, preferably implement on a same die 105, adapted to process data connections under the 3G or 2G communication networks. The first processor 110 and second processor 120 may be programmed by a firmware 102 to work cooperatively therewith to process different layers of data connections. The first processor 110 is also referred to as a modem CPU that controls radio frequency synthesizing and analog demodulation processes. The second processor 120 is referred to as an application CPU that is used for operating system and user layer applications.

Figure 2:
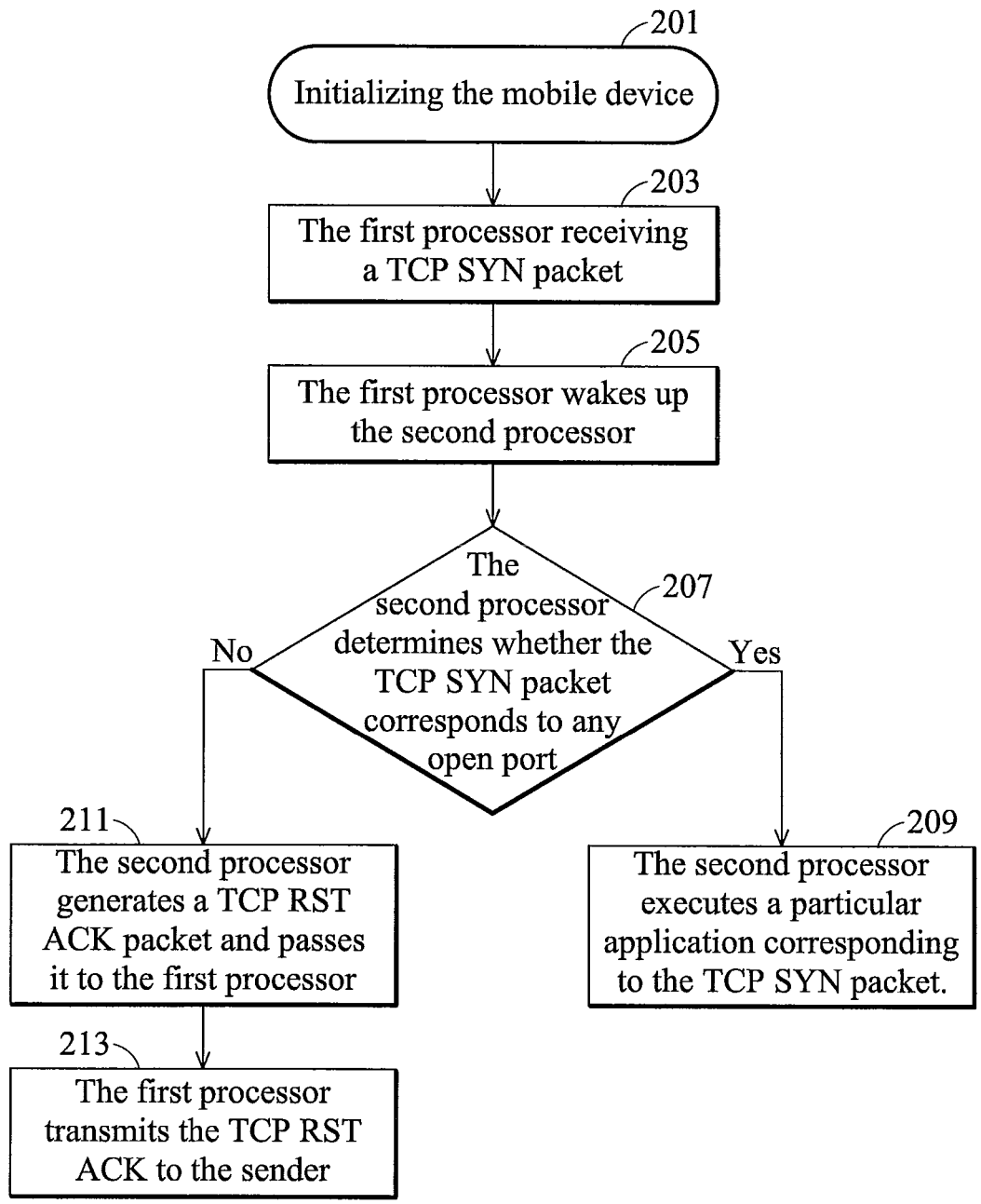
FIG. 2 is a flowchart of a conventional data connection method.

FIG. 2 is a flowchart of a conventional data connection method. In step 201, the mobile device 100 is initialized. In step 203, a TCP SYN packet may be first delivered to a radio stack (not shown) controlled by the first processor 110. In step 205, as the radio stack collects a complete TCP SYN packet, the first processor 110 wakes up the second processor 120 and passes the TCP SYN packet to the second processor 120 through proprietary mechanisms. In step 207, the second processor 120 then processes an operating system to check out all open port statuses to determine whether the TCP SYN packet corresponds to any open port. If the TCP SYN packet is targeted to a port bound to a particular application, step 209 is processed, wherein the second processor 120 executes the particular application to deal with the TCP SYN packet. Conversely, if the port is a closed port that is not bound to any application, step 211 is processed. In step 211, the second processor 120 generates a TCP RST ACK packet and passes it to the first processor 110. In step 213, the first processor 110 performs a transmitter function to modulate the TCP RST ACK into a radio frequency signal, which is then transmitted to the sender.

The disadvantage of the conventional data connection method in FIG. 2, is that the second processor 120 needs to be awaken to process every incoming packet (useful and garbage) passed from the first processor 110 in steps 205 and 207. The operating system must be activated to check the port statuses, whereby significant power is wasted on computation and memory resources.

In the embodiment of the mobile device 100, a mechanism is implemented to simplify the processing of garbage traffic. Specifically, the second processor 120 is not needed to process garbage traffic, such that significant power consumption can be reduced.

In the mobile device 100, a port map 135 is provided, maintaining a list of open ports for incoming data packets. The port map 135 may be created by the second processor 120 which is the main processor to run an operating system and various applications. A first processor 110 serves as a transceiver capable of receiving and demodulating inbound signals into data packets. Specifically, the inbound signals may be radio frequency (RF) signals, and the data packets are digitized baseband signals. The second processor 120 coupled to the first processor 110, is programmed to process various applications bound to at least one open port. The first processor 110 and second processor 120 may be implemented on the same die 105, however, the invention is not limited thereto. The operations performed by the first processor 110 and second processor 120 may be programmed by the firmware 102, depending on hardware capabilities. For example, the second processor 120 may enter a sleep mode to reduce power consumption if no data packet is sent from the first processor 110 to the second processor 120. When the first processor 110 receives an inbound request signal, the first processor 110 demodulates the inbound request signal into a first data packet targeted to a destination port. Instead of passing the first data packet to the second processor 120, the first processor 110 looks up the port map 135 to determine whether the destination port is listed in the port map 135. If the destination port is not listed in the port map 135, the inbound request signal is assessed as a garbage signal. Thus, the first processor 110 directly transmits a response signal to the sender of the inbound request signal or just omits the inbound request signal without waking up the second processor 120. Since the second processor 120 is not awakened, no extra power consumption is required to process garbage traffic.

Meanwhile, if the first processor 110 finds the destination port in the port map 135, it means that the first data packet may not be garbage traffic. Thus, the first processor 110 wakes up the second processor 120 and forwards the first data packet to the second processor 120. Upon awakening, the second processor 120 executes applications corresponding to the destination port of the first data packet, and performs successive processes.

As described, the port map 135 is preferably maintained by the second processor 120 as it controls all resources of the operating system, including applications and port resources. For example, the second processor 120 can process an application and write one or more open ports bound by the application into the port map 135. The mobile device 100 typically comprises a memory device 130 for runtime use, and the port map 135 is preferably implemented within the memory device 130. Other means for storage may also be adaptable for implementing and maintaining the port map 135, such as in a register, a non-volatile memory or a rewritable storage medium (not shown). If a particular application is closed, one or more corresponding ports bound by the application are instantly removed from the port map 135.

Since the port map 135 is meant to be read by the first processor 110, a firmware 102 may be provided to program the first processor 110 to do so without waking up the second processor 120.

In the mobile device 100, a battery 104 is operative to power the first processor 110 and second processor 120. Since battery life is crucial, when the second processor 120 is in the sleep mode, power consumption of the battery 104 is lowered.

In a specific embodiment, the first data packet may comprise a TCP SYN packet targeted to a first port. If the first processor 110 does not find the first port in the port map 135, the first processor 110 generates a TCP RST ACK packet to respond to the sender of the first data packet. The first data packet may be of various types not limited to a TCP SYN packet, and the first processor 110 is programmable to react accordingly with any predefined appropriate responses.

In a further embodiment, Internet Control Message Protocol (ICMP) can also be supported. Before looking up the port map 135, the first processor 110 determines whether the first data packet conforms to an ICMP. If the first data packet conforms to the ICMP, the first processor 110 directly generates the response signal or omits the first data packet without waking up the second processor 120. For example, the first data packet may be a PING request conforming to the ICMP. In response, the first processor 110 generates a PONG response according to the ICMP without waking up the second processor 120. Thereafter, with appropriate radio frequency modulation performed on the PONG response, the first processor 110 transmits the PONG response to the sender of the first data packet.

Figure 3:
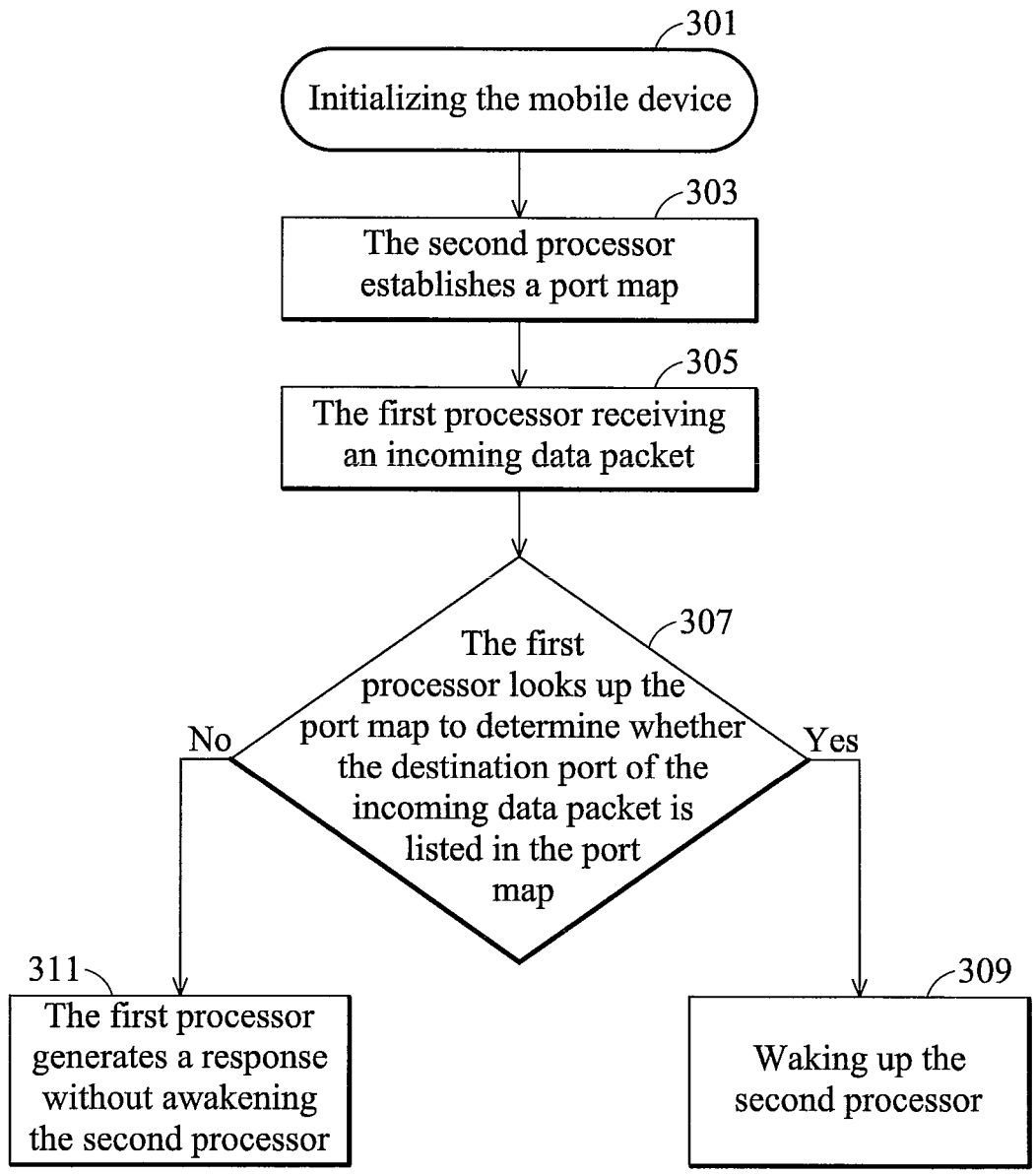
FIG. 3 is a flowchart of a data connection method according to the invention.

FIG. 3 is a flowchart of a data connection method according to the invention. The aforementioned embodiment of the mobile device 100 as shown in FIG. 1 which reduces power consumption, is summarized in the following.

In step 301, the mobile device 100 is initialized, and the firmware 102 programs the first processor 110 and second processor 120 with relevant functions. In step 303, the second processor 120 maintains a port map 135 in the memory device 130 according to applications running in the memory device 130. Any port bound to the applications would be listed in the port map 135. In step 305, the first processor 110 is programmed to receive all incoming data packets, so that the second processor 120 can enter a sleep status without being disturbed by garbage packets. In step 307, when the first processor 110 receives a data packet, the port map 135 is looked up to determine whether a destination port of the data packet is listed in the port map 135. If so, step 309 is processed, wherein the second processor 120 is awakened to perform relevant operations. If the destination of the data packet is not listed in the port map 135, step 311 is processed, wherein the first processor 110 generates a response or omits the data packet without awakening the second processor 120.

Figures 4, 5:
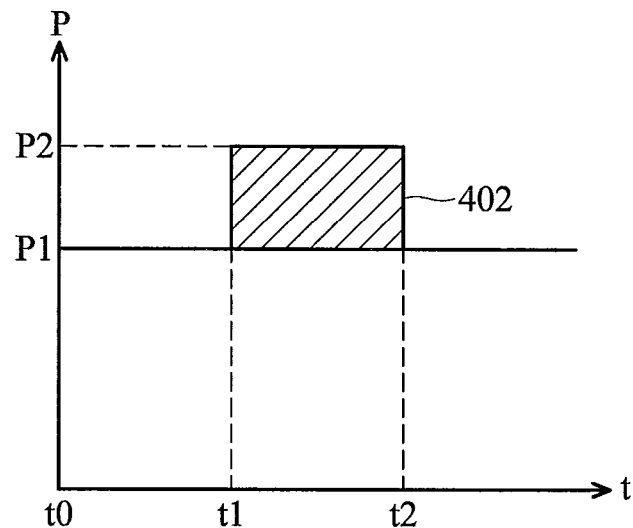
FIG. 4 shows an embodiment of power consumption of the mobile device with multiprocessor according to the invention.
FIG. 5 shows an embodiment of a port list according to the invention.

FIG. 4 shows an embodiment of power consumption of the mobile device according to the invention. In FIG. 4, the horizontal axis is time t, and the vertical axis is power consumption. During the period t0 to t1, the second processor 120 is in the sleep status while the first processor 110 is operative to perform transceiving functions. During the period of t1 to t2, the first processor 110 receives a garbage packet. For a conventional case as the method of FIG. 2, the power consumption between time t1 and t2 is increased to P2, because the second processor 120 is awaken to process the garbage packet. For the embodiment of FIG. 3, the power consumption remains subsequently P1. Thus the shadowed area 402 shows the power consumption saved by the embodiment of the invention in comparison to a conventional method.

FIG. 5 shows an embodiment of a port list according to the invention. A garbage packet may be of various protocol types, such as TCP or User Datagram Protocol (UDP) each associated to various target ports. The port map 135 may define a list of ports and protocol types according to applications run by the second processor 120 so that when an incoming packet arrives, the relevant ports can be looked up.

A mobile device installed with internet based operating system such as the Android, is particularly vulnerable to the garbage signal problem, because the Android typically relies on cloud computing services that requires intensive data connection to the internet. The garbage signal problem would cause significant power waste if no defensive measure is implemented, and the embodiments of the invention provides efficient solution for such an occasion.

The number of processors may not be limited to two, and the processors are not necessarily identical. In addition to the port map 135, a black list may also be implemented for the first processor 110 to filter out unwanted packets destined to open ports according to a senders' IP address or domain name, to further eliminate garbage traffic and reduce power consumption.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device, comprising:
    a memory device;
    a port map implemented in the memory device, maintaining a list of open ports for incoming data packets;
    a first processor, coupled to the port map, receiving and demodulating inbound signals into data packets;
    a second processor, coupled to the first processor, processing at least one application binding at least one open port, wherein
    the second processor dynamically maintains the port map according to applications that are processed by the second processor and currently running in the memory device,
    when the second processor processes the at least one application, the second processor writes the at least one open port bound by the at least one application into the port map,
    if the at least one application is closed, the at least one open port bound by the at least one application is removed from the port map,
    when the first processor receives an inbound request signal, the first processor demodulates the inbound request signal into a first data packet targeted to a destination port, and looks up the port map to determine whether the destination port is listed in the port map,
    if the destination port is not listed in the port map, the first processor transmits a response signal to the sender of the inbound request signal or omits the inbound request signal without waking up the second processor when the second processor is in a sleep mode, and
    if the destination port is listed in the port map, the first processor wakes up the second processor and forwards the first data packet to the second processor.

2. The mobile device as claimed in claim 1, wherein:
    if the first processor finds the destination port in the port map, the first processor wakes up the second processor, and forwards the first data packet to the second processor; and
    upon being awaken, the second processor executes an application corresponding to the destination port to process the first data packet.

3. The mobile device as claimed in claim 1, further comprising a firmware, programmable to direct the first processor to look up the port map and generate the response signal without waking up the second processor.

4. The mobile device as claimed in claim 1, further comprising a battery, operative to power the first processor and second processor, wherein when the second processor is in the sleep mode, power consumption of the battery is reduced.

5. The mobile device as claimed in claim 1, further comprising a memory device coupled to the first processor and the second processor, providing runtime memory capacities for the at least one application, wherein the port map is stored in the memory device.

6. The mobile device as claimed in claim 1, wherein;
    the first data packet comprises a TCP SYN packet targeted to a first port; and
    if the first processor does not find the first port in the port map, the first processor generates a TCP RST ACK packet to respond to the sender of the first data packet or omits the first data packet.

7. The mobile device as claimed in claim 1, wherein if the first data packet conforms to an Internet Control Message Protocol (ICMP), the first processor generates the response signal or omits the first data packet without waking up the second processor.

8. The mobile device as claimed in claim 7, wherein:
    the first data packet is a PING request conforming to the ICMP; and
    the first processor generates a PONG response according to the ICMP without waking up the second processor, and transmits the PONG response to the sender of the first data packet.

9. A data connection method adapted in a mobile device comprising a first processor and a second processor, comprising:
    maintaining a port map implemented in a memory device and comprising a list of open ports for incoming data packets;
    enabling the first processor to receive and demodulate inbound signals into data packets;
    enabling the second processor to process at least one application and binding at least one open port bound;
    dynamically maintaining, by the second processor, the port map according to applications that are processed by the second processor and currently running in the memory device,
    processing, by the second processor, the at least one application, and writing the at least one open port bound by the at least one application into the port map,
    if the at least one application is closed, removing the at least one open port bound by the at least one application from the port map,
    the first processor, receiving an inbound request signal, demodulating the inbound request signal into a first data packet targeted to a destination port, and looking up the port map to determine whether the destination port is listed in the port map;
    if the destination port is not listed in the port map, the first processor, transmitting a response signal to the sender of the inbound request signal or omitting the inbound request signal without waking up the second processor when the second processor is in a sleep mode; and
    if the destination port is listed in the port map, the first processor, waking up the second processor and forwards the first data packet to the second processor.

10. The data connection method as claimed in claim 9, further comprising:

if the destination port is found in the port map, the first processor waking up the second processor and forwarding the first data packet to the second processor; and upon being awaken, the second processor processing an application corresponding to the destination port to process the first data packet.

11. The data connection method as claimed in claim 10, further comprising providing a memory device for runtime memory capacities when the second processor executes applications, wherein the port map is stored in the memory device.

12. The data connection method as claimed in claim 9, further comprising, programming the first processor by a firmware to perform the looking up step and generation of the response signal without waking up the first processor.

13. The data connection method as claimed in claim 9, further comprising powering the first processor and second processor by a battery, and lowering output power of the battery when the second processor is in the sleep mode.

14. The data connection method as claimed in claim 9, wherein:

the first data packet comprises a TCP SYN packet targeted to a first port; and the looking up step comprises, if the first processor does not find the first port in the port map, the first processor generating a TCP RST ACK packet to respond to the sender of the first data packet or omitting the first data packet.

15. The data connection method as claimed in claim 9, wherein the looking up step further comprises, if the first data packet conforms to an Internet Control Message Protocol (ICMP), the first processor generating the response signal or omitting the first data packet without waking up the second processor.

16. The data connection method as claimed in claim 15, wherein:

the first data packet is a PING request conforming to the ICMP; and the step of generating the response signal comprises, the first processor generating a PONG response according to the ICMP protocol without waking up the second processor, and the step of performing transmitter functions comprises, transmitting the PONG response to the sender of the first data packet.

* * * * *